Dec. 15, 1936.  J. B. BARTOW  2,064,722
AEROPLANE LIGHTING SYSTEM
Filed July 20, 1935   3 Sheets-Sheet 1
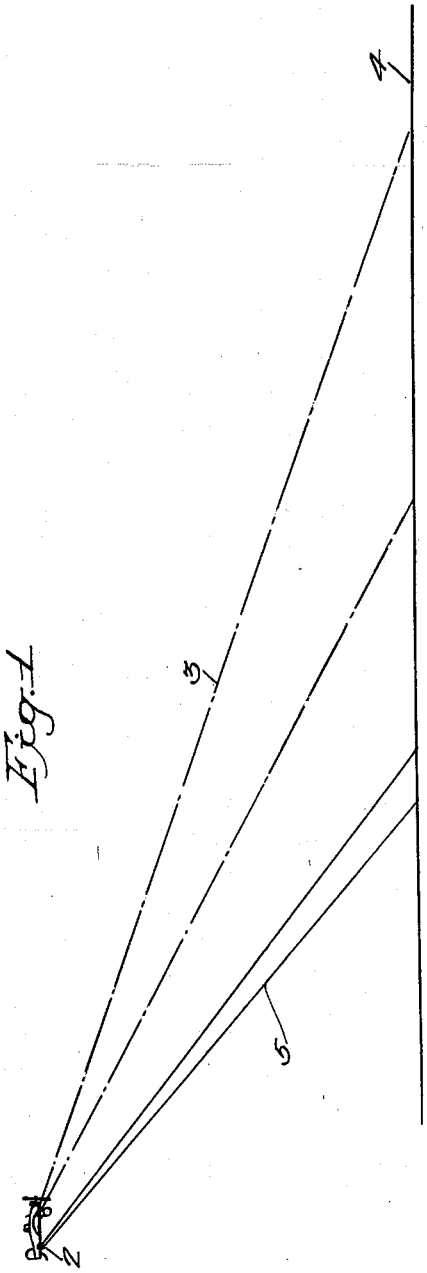
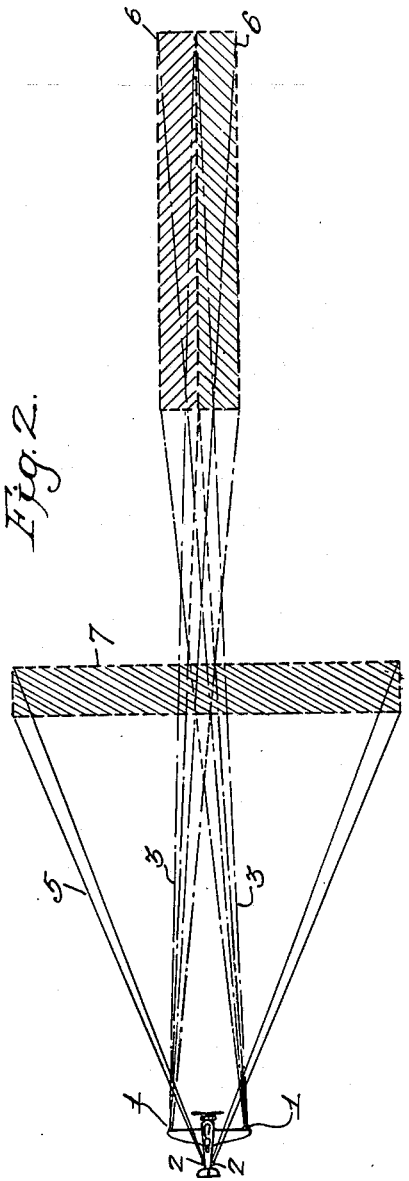
Inventor:—
John B. Bartow
by his Attorneys
Howson & Howson Dec. 15, 1936. J. B. BARTOW 2,064,722
AEROPLANE LIGHTING SYSTEM
Filed July 20, 1935   3 Sheets-Sheet 2
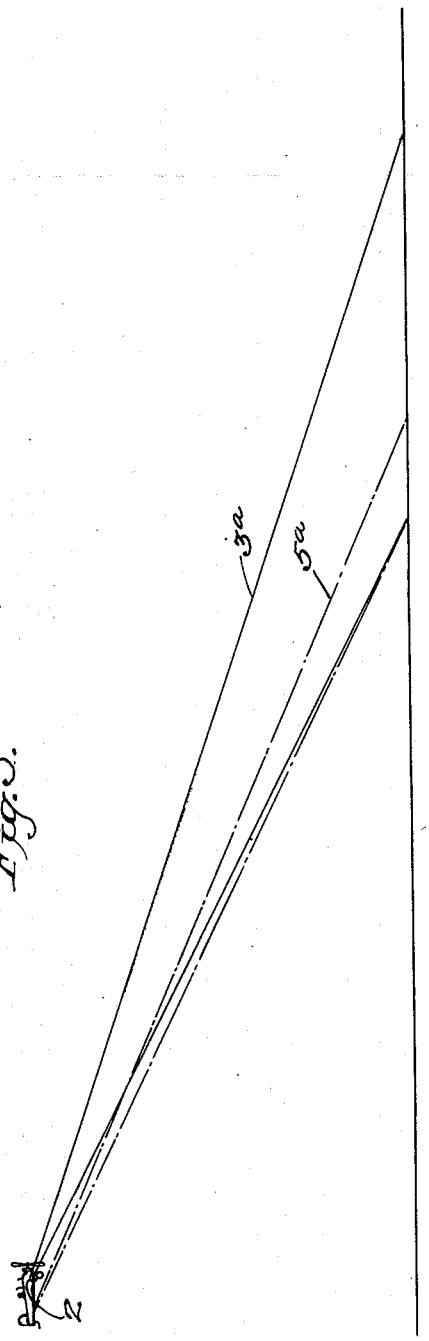
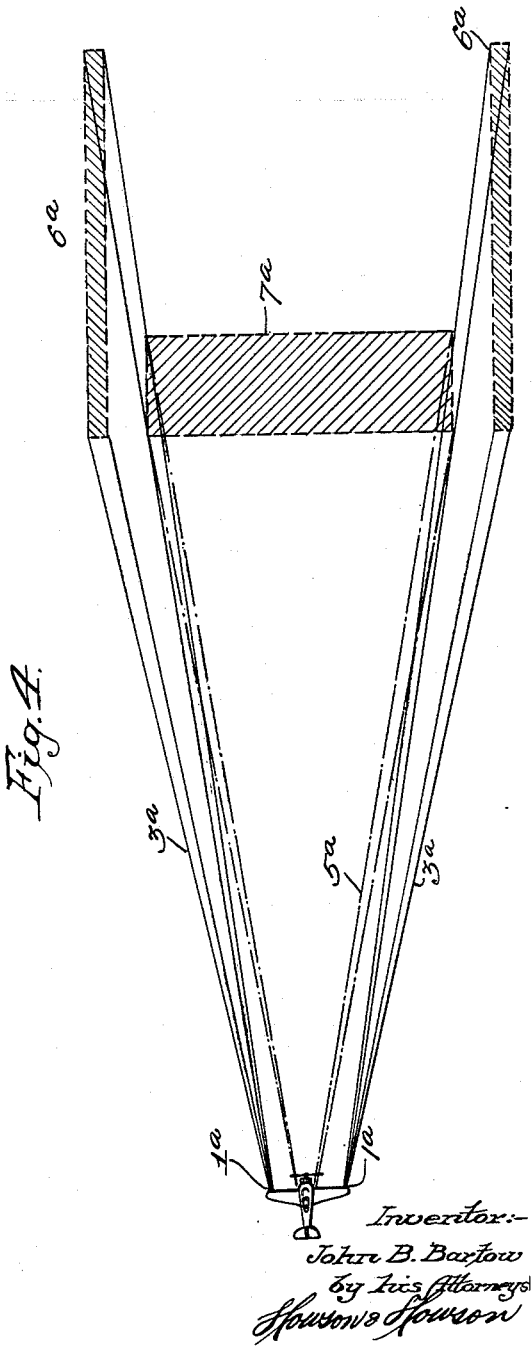

Dec. 15, 1936.   J. B. BARTOW   2,064,722
AEROPLANE LIGHTING SYSTEM
Filed July 20, 1935   3 Sheets-Sheet 3
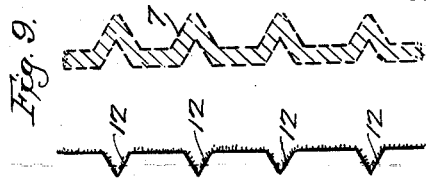
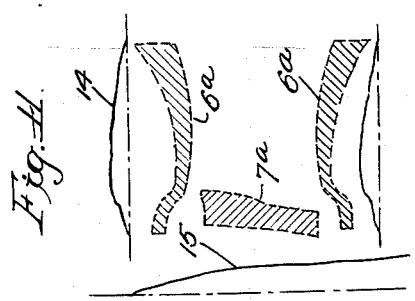
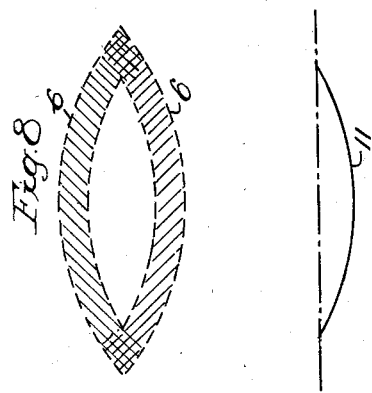
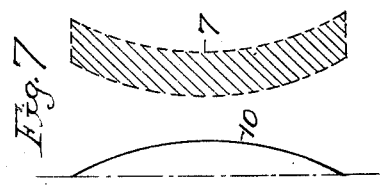
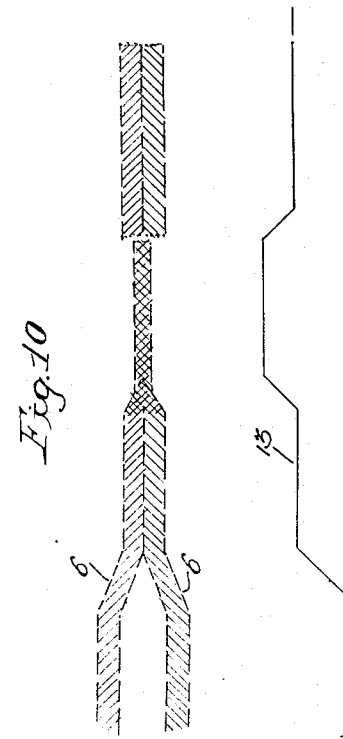
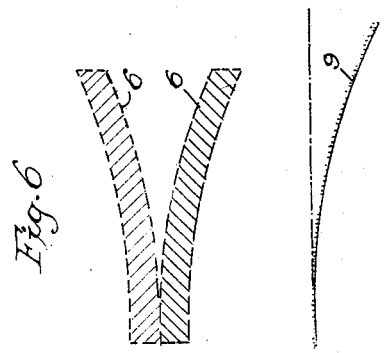
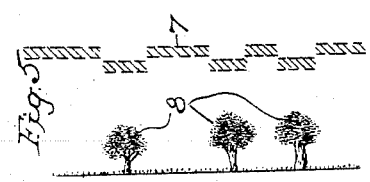
Inventor:—
John B. Bartow
by his Attorneys
Howson & Howson Patented Dec. 15, 1936

2,064,722

UNITED STATES PATENT OFFICE 2,064,722

AEROPLANE LIGHTING SYSTEM

John B. Bartow, Blue Bell, Pa.

Application July 20, 1935, Serial No. 32,446

8 Claims. (Cl. 33—46)

This invention relates to aircraft lighting systems and, more particularly, to lighting systems for enabling the safe landing of aircraft at night in places with which the pilot is unfamiliar. The problem of safe landing of aircraft at night in fields or localities with which the pilot is unfamiliar is well known. Many accidents in the past have been due to the inability of pilots while landing their aircraft to tell the contour of the earth's surface or the shape of objects thereon or the elevation of the aircraft above the earth's surface. Thus in locations where the earth's surface is of extremely variable or irregular contour or where objects such as trees project upward from the earth's surface, the landing of aircraft is extremely hazardous and in order for a pilot to make a safe landing, it is essential that he know his elevation and that he be apprised of the contour of the earth's surface and the shape of objects thereon at the landing location.

One object of the invention is to provide a novel lighting system for aircraft which will enable an aircraft pilot to tell the contour of the earth's surface and the shape of objects thereon while in flight and particularly during landing at night in places with which he is unfamiliar.

Another object of the invention is to provide a lighting system of this character which will enable an aircraft pilot to tell the approximate elevation of the craft above the earth's surface.

A further object of the invention is to provide a novel lighting system of this character comprising a certain arrangement of light sources or light projectors of distinctive character whereby a certain arrangement of distinctive light images or figures is formed upon the earth's surface and the pilot is apprised of the above-mentioned factors which are vital to safe landing.

Other objects and features of the invention will appear hereinafter.

In the accompanying drawings:

Figure 1 is an elevational view showing an aeroplane in flight and the elevational projection of light beams in accordance with the invention;

Fig. 2 is a corresponding plan view illustrating the arrangement and character of the light images or figures formed in accordance with the invention;

Fig. 3 is an elevational view similar to Fig. 1 but showing a different elevational projection of light beams in accordance with the invention;

Fig. 4 is a corresponding plan view showing the arrangement and character of the light images or figures; and Figs. 5 to 11 are illustrations of the light images or figures under various conditions showing the manner in which the aircraft pilot is apprised of such conditions.

The present invention comprises two essential features, viz. the positioning of a plurality of light projectors in a certain manner on an aircraft and the specific character of the light beams projected by such projectors. Considering first the positioning of the light projectors, it may be noted that if one looks directly along a beam of light projected onto an object or a surface, it is practically impossible for the observer to tell the exact shape or contour of the object or surface or the exact disposition thereof in space. This is due to the fact that the eye sees an object by virtue of the reflection of incident light by the object to the eye and, in any case such as that mentioned, where the eye is in line with the light projected onto the object, the reflected light rays take the same path as the projected light rays. Moreover, in order for the eye to see the contour or shape of an object, it is necessary that the image conveyed to the eye by the reflected light shall be a perspective or "relief" image of the said object and this can be obtained only by having the projected light and the reflected light non-coincident and at different angles. Therefore, in order for an observer to tell the contour or shape of an object, it is necessary that the line of vision of the observer toward the object be non-coincident with and at an angle to the direction of the light projected toward the object and as a result of which the object is seen.

In accordance with the present invention, therefore, the light sources or light projectors are mounted upon the aircraft at such positions that the projected light beams are non-coincident with and at an angle to the pilot's normal line of vision toward the earth during flight, i. e., the light projectors are offset from the pilot's position in the aircraft so that the line of vision of the pilot as he views the images or figures is at an angle to the projected beams of light. Referring to Figs. 1 and 2, in the specific illustration, a pair of similar light projectors 1 are mounted upon the wings of the aeroplane, while a third light projector 2 is mounted at or near the tail end of the plane. The light projectors 1 are arranged to project crossed light beams 3 toward the earth's surface 4 in advance of the aircraft, as illustrated, while the light projector 2 is arranged to project the light beam 5 toward the earth's surface in advance of the aircraft. It will be seen that, because of the offset position of the light projectors 1 and 2, these light beams are non-coincident with and at an angle to the pilot's normal line of vision toward the earth during flight from his position in the cockpit of the aeroplane as he views the image or images projected on the earth's surface. It will be understood, of course, that the positions of the light projectors may be varied so long as the condition mentioned is maintained.

In further accordance with the invention, the light projectors 1 are adapted to project light beams of elongated, rectangular character such that similar images 6 will be formed upon the earth's surface in advance of the aircraft. It will be seen that these images are of elongated, rectangular form extending in the direction of travel of the plane. The light projector 2 is also adapted to project an elongated, rectangular light beam but such beam is arranged transversely of the direction of travel of the aeroplane so that a transverse elongated, rectangular image 7 is formed upon the earth's surface in advance of the aircraft. It will be understood that the various light projectors will remain fixed in position when once adjusted. The light projectors may be very readily adapted to project the desired light beams by simple methods of design which are now well known. For example, the desired form of the light beams may be obtained by providing a specific form of reflector or by the use of a specific lens or by both of these methods conjunctively.

In Figs. 3 and 4, the positions of the light projectors remain the same, but the light projectors 1a are arranged so that their light beams 3a do not cross each other, and the light projector 2a is arranged so that its light beam 5a forms an image 7a between the images 6a. Moreover, the projectors are, in this case, adapted to project beams of specifically different proportions as illustrated, the resulting light images 6a being narrow and the image 7a being wider.

It will be appreciated from the illustration of Figs. 1 to 4 that the light images 6 or 6a will vary in position relative to one another depending upon the elevation of the plane above the earth's surface and the length of such images will also vary with the plane's elevation. Likewise, the length of the image 7 or 7a will vary with the elevation of the plane. Furthermore, the shapes or forms of the light images or figures will vary in accordance with the contour of the earth's surface or in accordance with the shape of objects thereon. Figs. 5 to 11 illustrate the various ways in which the shapes of the light images or figures may vary. In all of these figures, the direction of travel of the aircraft is to be assumed from left to right.

Referring to Fig. 5, let it be supposed that the aircraft is approaching a row of trees 8. The interception of the transverse light beam 5 by the trees will cause the image 7 to appear as illustrated in Fig. 5. This will apprise the pilot at once of the presence of the trees 8 and he will be enabled to tell the approximate shape and size of the trees due to the fact that his line of vision is non-coincident with and at an angle to the light beam 5 as above explained.

In Fig. 6, there is illustrated the condition existing when the aircraft is approaching a slope 9 in the earth's surface, the slope being downward in the direction of travel of the plane as indicated with relation to the horizontal broken line. Under such conditions, the light images 6 will diverge outward in the direction of travel as clearly indicated.

Fig. 7 shows a knoll or raised portion 10 of the earth's surface extending transversely of the direction of travel. The resulting shape of the light image 7 is as clearly illustrated.

Fig. 8 shows a depression or valley 11 extending in the direction of travel as indicated with respect to the broken horizontal line. The resulting elliptical formation of the light images 6 is clearly illustrated.

In Fig. 9, there are shown a series of depressions 12 in the earth's surface extending transversely of the direction of travel. The resulting formation of the light image 7 is clearly indicated.

In Fig. 10, a series of variations in level of the earth's surface are indicated at 13 and the corresponding relative positions of the light images 6 are clearly shown, thus illustrating the manner in which the light images 6 move toward or away from each other or even merge into one another.

In Fig. 11, there is illustrated at 14 a knoll or projection of the earth's surface in the direction of travel, and at 15 there is illustrated a transverse slope of the earth's surface. The consequent formations of the light images 6a and 7a are clearly illustrated.

It will be seen from a study of the various illustrations above discussed that the shape or form of the images or figures changes distinctively in form and in direction in accordance with the contour of the earth's surface and objects thereon, and it will also be seen that the size and relative disposition of the light images or figures varies with the elevation of the aircraft above the earth's surface. Thus by virtue of the positioning of the light projectors and the arrangement and distinctive character of the light images or figures projected thereby, the pilot is apprised of the factors which are vitally important in connection with safe landing at night in localities with which he is unfamiliar. Obviously, in using this system, a pilot will become accustomed to it and will instinctively associate various configurations and relative positions of the light images or figures with the conditions causing them and will be enabled to sense such conditions immediately.

Although the invention has been illustrated and described by way of certain specific embodiments for the purpose of disclosure, it will be understood that the principles of the invention may be applied by employing other specific embodiments without departing from the scope of the invention.

I claim:

1. A lighting system for an aircraft, comprising a fixed light projector mounted on said aircraft and projecting a light beam toward the earth in advance of said aircraft to form on level terrain an elongated, rectangular figure, said projector being offset from the pilot's position in said aircraft so that the line of vision of the pilot as he views the elongated, rectangular figure, is at an angle to the projected beam of light, said figure appearing on the earth's surface in advance of said aircraft and changing distinctively in shape in accordance with the contour of the earth's surface, whereby the pilot is enabled to discern the contour of the earth's surface in advance of said aircraft.

2. A lighting system for an aircraft, comprising a fixed light projector mounted on said aircraft and projecting a light beam toward the earth in advance of said aircraft to form on level terrain a relatively long and narrow, rectangular figure, said projector being offset from the pilot's position in said aircraft so that the line of vision of the pilot as he views the relatively long and narrow rectangular figure is at an angle to the projected beam of light, said figure appearing on the earth's surface in advance of said aircraft and having its greatest dimension disposed parallel to the direction of travel of the aircraft, said figure changing distinctively in shape in accordance with the contour of the earth's surface, whereby the pilot is enabled to discern the contour of the earth's surface in advance of said aircraft.

3. A lighting system for an aircraft, comprising a plurality of fixed light projectors mounted on said aircraft and projecting a plurality of light beams toward the earth in advance of said aircraft to form on level terrain elongated, rectangular figures, said projectors being offset from the pilot's position in said aircraft so that the line of vision of the pilot as he views the elongated, rectangular figures is at an angle to the projected beams of light, said figures appearing on the earth's surface in advance of said aircraft and each figure changing distinctively in shape in accordance with the contour of the earth's surface, whereby the pilot is enabled to discern the contour of the earth's surface in advance of said aircraft.

4. A lighting system for an aircraft, comprising a pair of fixed light projectors mounted on said aircraft and projecting angularly related light beams toward the earth in advance of said aircraft to form on level terrain parallel, elongated, rectangular light images on the earth's surface in advance of the aircraft, each of said light projectors being offset from the pilot's position in said aircraft so that the line of vision of the pilot as he views the said light images is at an angle to the angularly related light beams from said pair of light projectors, said images varying in relation to each other in accordance with the elevation of the aircraft and changing distinctively in shape in accordance with the contour of the earth's surface on which said images are projected, whereby the pilot is apprised of the aircraft's elevation and of the earth's contour in advance of said aircraft.

5. A lighting system for an aircraft, comprising a fixed light projector mounted on said aircraft and projecting a light beam toward the earth in advance of said aircraft to form on level terrain an elongated, rectangular light image, said light projectors being offset from the pilot's position in said aircraft so that the line of vision of the pilot as he views the said light image is at an angle to the projected beam of light, said light image appearing on the earth's surface in advance of said aircraft and having its greatest dimension disposed transversely of the direction of travel of the aircraft, said image changing distinctively in shape in accordance with the contour of the earth's surface and when objects thereon are encountered, whereby the pilot is enabled to discern the contour of the earth's surface and the configuration of objects thereon in advance of said aircraft.

6. A lighting system for an aircraft, comprising a plurality of fixed light projectors mounted on said aircraft and projecting a plurality of light beams toward the earth in advance of the aircraft to form on level terrain a plurality of elongated, rectangular light images, each of said light projectors being offset from the pilot's position in said aircraft so that the line of vision of the pilot as he views the elongated, rectangular light images is at an angle to the projected beams of light, one of said projectors projecting a light beam of such character that the elongated, rectangular light image formed on the earth's surface has its greatest dimension disposed parallel to the direction of travel of the aircraft, another of said projectors projecting a light beam of such character that the elongated, rectangular light image formed on the earth's surface has its greatest dimension disposed transversely to the direction of travel of the aircraft, whereby said light images change distinctively in shape in accordance with the contour of the earth's surface and when objects thereon are encountered, so that the pilot is enabled to discern the contour of the earth's surface and the configuration of objects thereon in advance of said aircraft.

7. A lighting system for an aircraft, comprising a plurality of fixed light projectors mounted on said aircraft and projecting a plurality of light beams toward the earth in advance of the aircraft to form on level terrain a plurality of elongated, rectangular light images, each of said light projectors being offset from the pilot's position in said aircraft so that the line of vision of the pilot as he views the elongated, rectangular light images is at an angle to the projected beams of light, a pair of said projectors projecting light beams of such character that a pair of parallel elongated, recetangular light images are formed on the earth's surface, each with their greatest dimension disposed parallel to the direction of travel of the aircraft, another of said projectors projecting a light beam of such character that an elongated, rectangular light image is formed on the earth's surface with its greatest dimension disposed transversely to the direction of travel of the aircraft and in predetermined relation to said first mentioned images, whereby the relation of the light images changes distinctively with the aircraft's elevation above the earth and whereby the said light images change distinctively in shape in accordance with the contour of the earth's surface and when objects thereon are encountered, so that the pilot is enabled to tell the aircraft's elevation and to discern the contour of the earth's surface and the configuration of objects thereon in advance of said aircraft.

8. A lighting system for an aircraft comprising a pair of fixed light projectors, one of which is mounted near each opposite end of a wing of said aircraft and each of which projects a beam of light toward the earth in advance of said aircraft to form on level terrain a pair of substantially parallel, elongated, rectangular figures having their greatest length disposed parallel to the direction of travel of the aircraft, and a third light projector mounted near the tail of said aircraft and projecting a beam of light toward the earth in advance of said aircraft to form on level terrain an elongated, rectangular figure having its greatest length disposed transversely of the direction of travel of the aircraft, all of said light projectors being offset from the pilot's position in said aircraft so that the line of vision of the pilot as he views the figures is at an angle to the projected beams of light, the position on the earth's surface of the figures projected from the pair of light projectors on the wing bearing a predetermined relation to the figure projected from the light on the tail, whereby the relation of said figures changes distinctively with the aircraft's elevation above the earth and whereby the said figures change distinctively in shape in accordance with the contour of the earth's surface and when objects thereon are encountered, so that the pilot is enabled to tell the aircraft's elevation and to discern the contour of the earth's surface and the configuration of objects thereon in advance of said aircraft.

JOHN B. BARTOW.